(No Model.)
F. BURCKHARDT.
MACHINE FOR CUTTING OATS, &c.
No. 313,987. Patented Mar. 17, 1885.
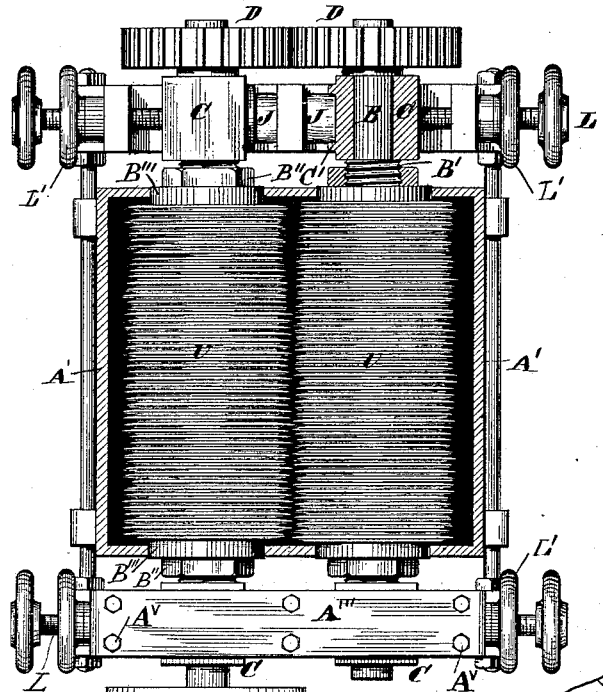
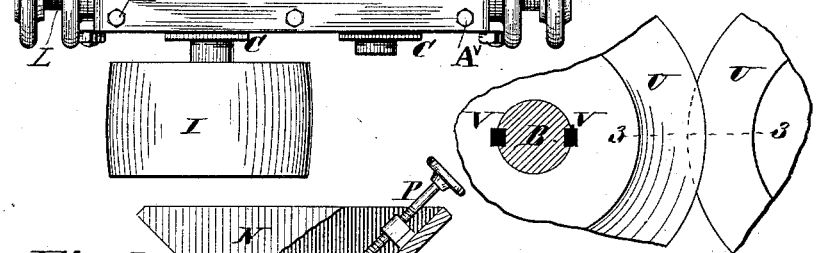
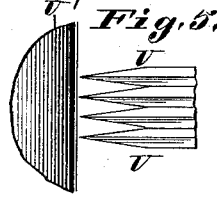
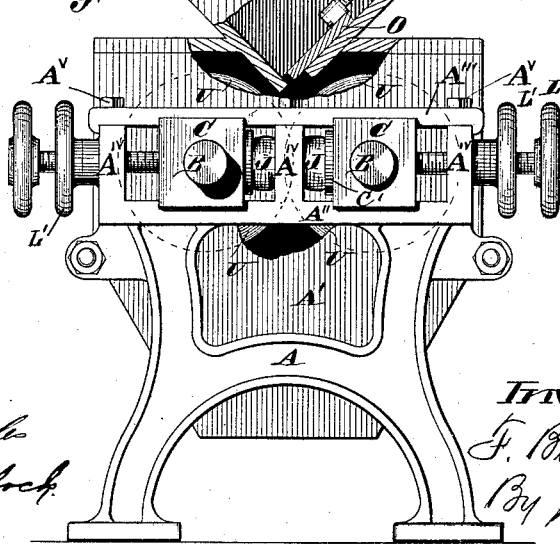
Attest:
Charles Pickels
Geo. L. Wheelock
Inventor:
F. Burckhardt
By Knight Bros.
Atty's

UNITED STATES PATENT OFFICE.

FREDRICH BURCKHARDT, OF ST. CHARLES, MISSOURI.

MACHINE FOR CUTTING OATS, &c.

SPECIFICATION forming part of Letters Patent No. 313,987, dated March 17, 1885.

Application filed June 21, 1884. (No model.)

*To all whom it may concern:*

Be it known that I, FREDRICH BURCKHARDT, of St. Charles, in the county of St. Charles and State of Missouri, have invented a certain new and useful Improvement in Machines for Cutting Oats, &c., of which the following is a full, clear, and exact description, reference being had to the accompanying drawings, forming part of this specification, and in which—

Figure 1 is a top view, part in section, of my improved slicing-machine. Fig. 2 is an end view thereof, part broken away. Fig. 3 is a detail section of the rolls, showing the form of dress, taken on the line 3 3, Fig. 4. Fig. 4 is an end view of the rollers, showing one of the shafts in section. Fig. 5 is a detail view of a modification.

My invention relates to a machine for slicing or cutting oats or other grain; and my improvement consists in features of novelty hereinafter fully described, and pointed out in the claim.

Referring to the drawings, A represents the frame of the apparatus, supporting a casing, A', forming a receptacle for the sliced material, and the shafts B, in journal-boxes C on ways A'', having top plates, A''', secured to the vertical portions $A^{iv}$ by bolts $A^v$. The shafts are geared together by cog-wheels D, one of the shafts being provided with a driving-pulley, I. The boxes of the two shafts are formed with sockets C' on their inner sides, and the shafts are arranged in the boxes to be moved to or from each other, to make the machine cut or slice thinner or thicker, the boxes being forced apart by springs J, seated at one end in a socket, C', and at the other end bearing against the central vertical portion. The boxes are caused to approach each other by set-screws L, locked by nuts L'.

N represents a feed-hopper (see Fig. 2) provided with a suitable valve or slide, O, operated by a screw, P.

On each shaft B are a number of disks, U, having sharp cutting knife-edge peripheries, those of the opposite shafts preferably interlocking, as shown in Fig. 3.

On the inside of the journal-boxes on the shafts B are screw-threads B', receiving nuts B'', bearing against collars B''', which keep the disks from endwise movement on the shafts. The knife-edge peripheries form V-shaped grooves between them.

The disks are held from turning on the shafts by feathers V, (see Fig. 4,) or other suitable means. It will thus be seen that as these rollers are turned toward each other they will slice and cut the grain as it falls between them from the hopper in the most effective manner.

One of the rollers could be made plain, as shown at U' in Fig. 5, and the sharp edges of the other cutting against it would in a measure act in the same manner as my preferred form.

I claim as my invention—

A machine for cutting oats, comprising a frame, A, formed with ways A'' A'', vertical portions $A^{iv}$ $A^{iv}$ $A^{iv}$, top plates, A''' A''', capping said portions, bolts $A^v$, journal-boxes C, formed with sockets C', and mounted on the ways between the central vertical portions and the outer portions, springs located in the sockets and bearing against the central vertical portions, adjusting-screws L, nuts L', to lock the screws, shafts B B, slicing cutting-surfaces keyed to the shafts, cog-wheels D D on the shafts, driving-pulley I, a casing, A', inclosing the cutting-surfaces, a feed-hopper, and devices to regulate the feeding of the rolls, as set forth.

FREDRICH BURCKHARDT.

In presence of—
GEO. H. KNIGHT,
SAML. KNIGHT.